United States Patent
Langadi et al.

(10) Patent No.: US 11,663,095 B2
(45) Date of Patent: *May 30, 2023

(54) ERROR DETECTION CIRCUIT

(71) Applicant: TEXAS INSTRUMENTS INCORPORATED, Dallas, TX (US)

(72) Inventors: Saya Goud Langadi, Bengaluru (IN); Srinivasa Chakravarthy Bs, Bengaluru (IN)

(73) Assignee: Texas Instmments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/372,599

(22) Filed: Jul. 12, 2021

(65) Prior Publication Data
US 2021/0342233 A1    Nov. 4, 2021

Related U.S. Application Data

(63) Continuation of application No. 16/396,941, filed on Apr. 29, 2019, now Pat. No. 11,061,783.

(51) Int. Cl.
G06F 11/16    (2006.01)
G06F 11/10    (2006.01)

(52) U.S. Cl.
CPC ........ G06F 11/167 (2013.01); G06F 11/1044 (2013.01); G06F 11/1645 (2013.01)

(58) Field of Classification Search
CPC . G06F 11/167; G06F 11/1044; G06F 11/1645
See application file for complete search history.

(56) References Cited

U.S. PATENT DOCUMENTS

| 11,061,783 | B2* | 7/2021 | Langadi | G06F 11/1645 |
| 2004/0243906 | A1* | 12/2004 | Huang | G06F 11/1068 714/E11.038 |
| 2006/0242488 | A1* | 10/2006 | You | G06F 11/1068 714/718 |
| 2009/0049350 | A1* | 2/2009 | Parris | G11C 29/02 714/720 |

* cited by examiner

Primary Examiner — Thien Nguyen
(74) Attorney, Agent, or Firm — Michael T. Gabrik; Frank D. Cimino

(57) ABSTRACT

A circuit and method for verifying the operation of error checking circuitry. In one example, a circuit includes a memory, a first error checking circuit, a second error checking circuit, and a comparison circuit. The memory includes a data output. The first error checking circuit includes an input and an output. The input of the first error checking circuit is coupled to the data output of the memory. The second error checking circuit includes an input and an output. The input of the second error checking circuit is coupled to the data output of the memory. The comparison circuit includes a first input and a second input. The first input is coupled to the output of the first error checking circuit. The second input is coupled to the output of the second error checking circuit.

20 Claims, 4 Drawing Sheets

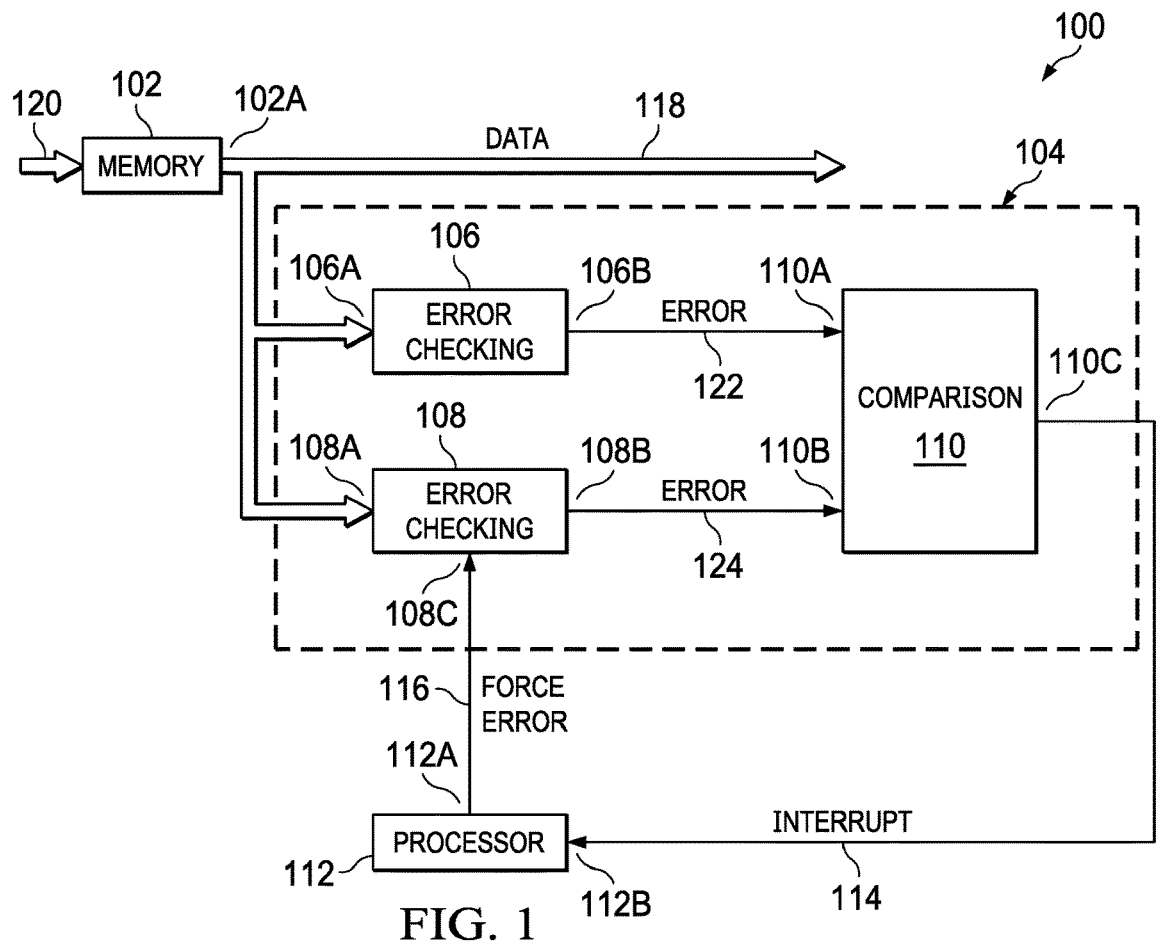
FIG. 1
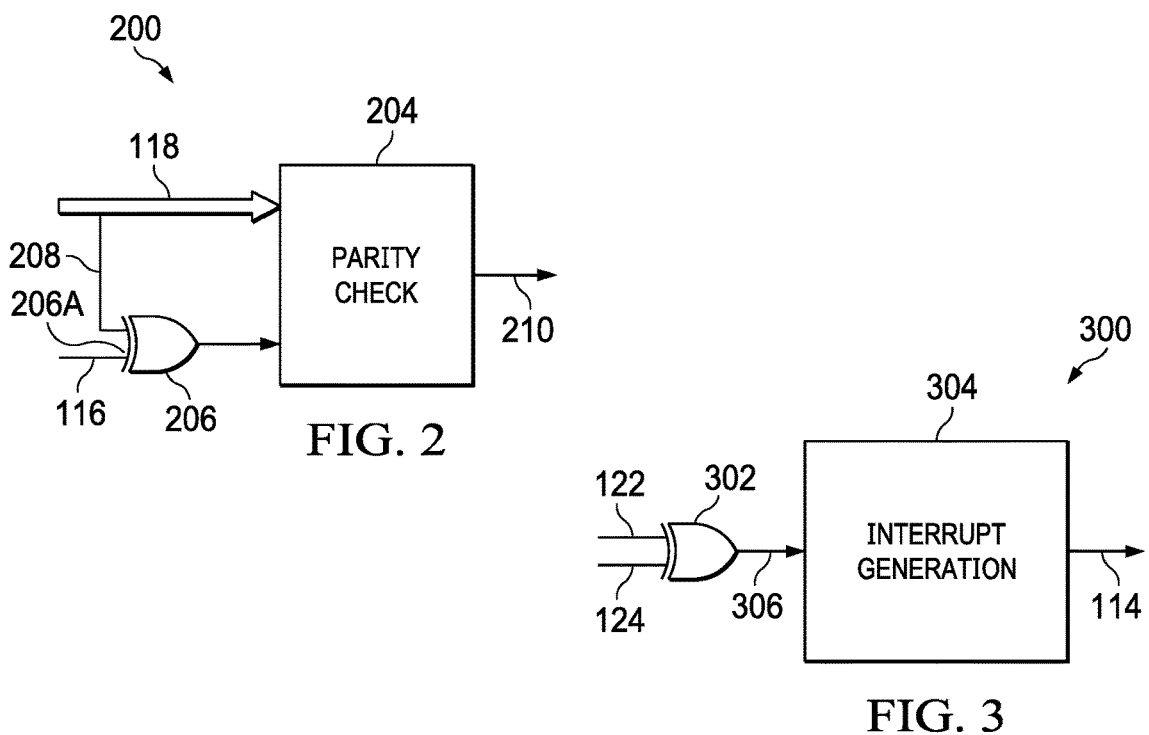
FIG. 2
FIG. 3

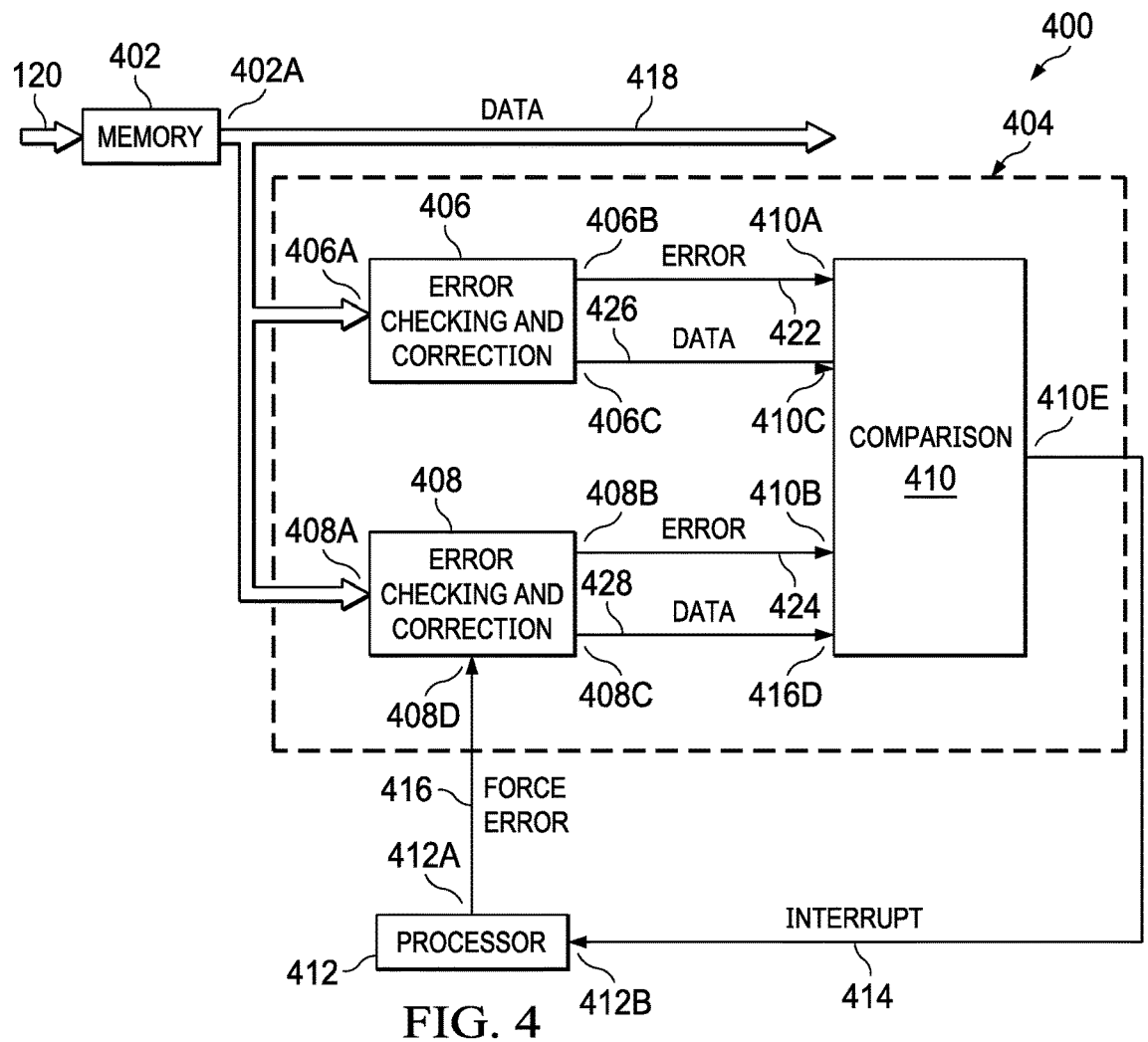
FIG. 4
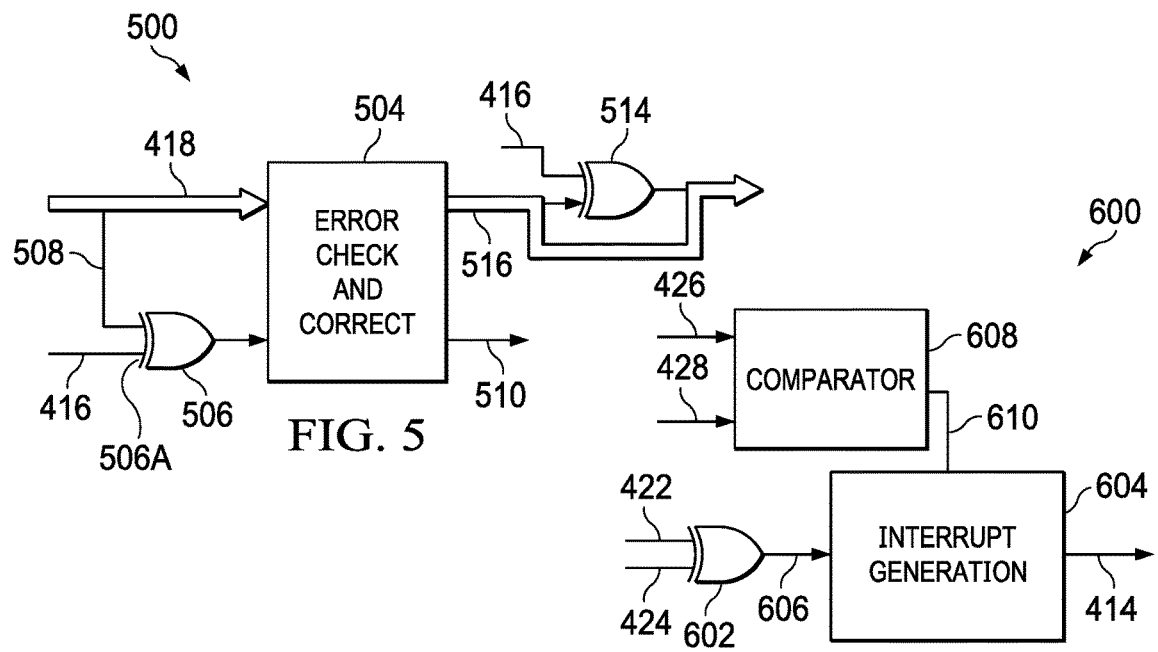
FIG. 5
FIG. 6

ERROR DETECTION CIRCUIT

CROSS-REFERENCE TO RELATED APPLICATIONS

This application is a continuation of U.S. patent application Ser. No. 16/396,941, filed Apr. 29, 2019, which is incorporated by reference herein in its entirety.

BACKGROUND

Semiconductor memories are susceptible to both hard and soft errors. Soft errors occur, for example, when sub-atomic energetic particles strike the memory and generate sufficient charge to upset the state of a memory cell. Hard errors are caused, for example, by defects in the semiconductor device created during manufacturing. Some semiconductor memories include error detection circuitry, such as parity checking circuitry, and/or error correcting code (ECC) circuitry to correct detected errors. In an ECC protected memory, when a data value is written into the memory, the ECC circuitry computes an ECC value and the ECC value is stored in the memory in conjunction with a data value. The ECC circuitry uses the ECC value to detect, and possibly correct, errors in the data value when the data value is read from the ECC protected memory.

SUMMARY

A circuit and method for verifying the operation of error checking circuitry are disclosed herein. In one example, a circuit includes a memory, a first error checking circuit, a second error checking circuit, and a comparison circuit. The memory includes a data output. The first error checking circuit includes an input and an output. The input of the first error checking circuit is coupled to the data output of the memory. The second error checking circuit includes an input and an output. The input of the second error checking circuit is coupled to the data output of the memory. The comparison circuit includes a first input and a second input. The first input is coupled to the output of the first error checking circuit. The second input is coupled to the output of the second error checking circuit.

In another example, an error detection circuit includes a first error checking circuit, a second error checking circuit, and a comparison circuit. The first error checking circuit is configured to detect an error in an input data value. The second error checking circuit is disposed in parallel with the first error checking circuit, and is configured to detect the error in the input data value. The comparison circuit is coupled to the first error checking circuit and the second error checking circuit, and is configured to detect a difference in error checking by the first error checking circuit and error checking by the second error checking circuit.

In a further example, a method for error checking includes providing a data value to a first error checking circuit and a second error checking circuit. The data value is verified in the first error checking circuit. The data value is verified in the second error checking circuit. A result of the verifying in the first error checking circuit and a result of the verifying in the second error checking circuit are compared.

BRIEF DESCRIPTION OF THE DRAWINGS

For a detailed description of various examples, reference will now be made to the accompanying drawings in which:

FIG. 1 shows a block diagram for an example system that includes error checking circuitry in accordance with the present disclosure;

FIG. 2 shows a block diagram for an example error checking circuit suitable for use in error checking circuitry of FIG. 1;

FIG. 3 shows a block diagram for an example comparison circuit suitable for use in error checking circuitry of FIG. 1;

FIG. 4 shows a block diagram for an example system that includes error checking and correction circuitry in accordance with the present disclosure;

FIG. 5 shows a block diagram for an example error check and correct circuit suitable for use in the error checking and correction circuit of FIG. 4;

FIG. 6 shows a block diagram for an example comparison circuit suitable for use in the error checking and correction circuit of FIG. 4;

DETAILED DESCRIPTION

Figure 7:
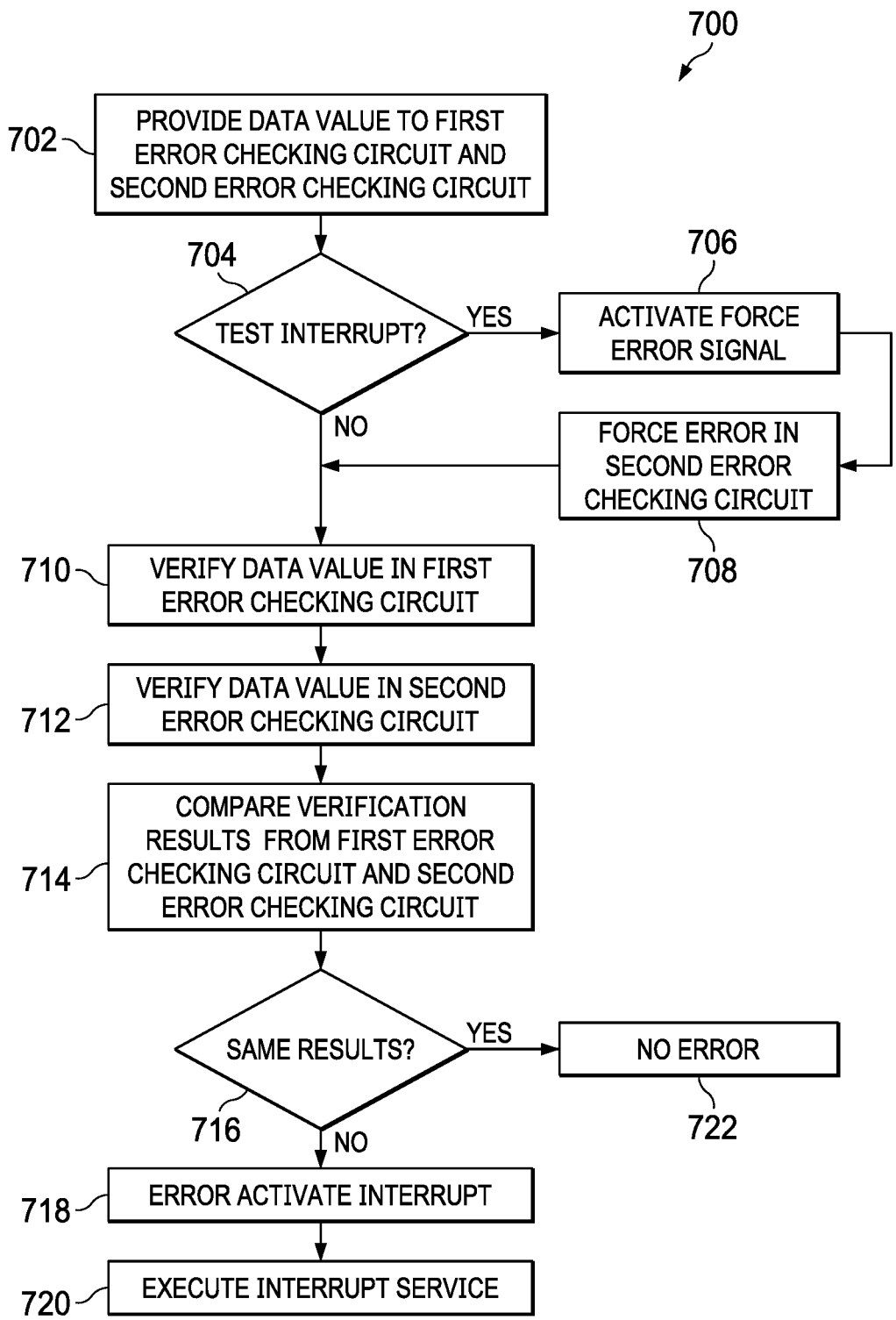
FIG. 7 shows a flow diagram for an example method for error checking in accordance with the present disclosure.

Because data can be corrupted in storage or transfer, error detection and/or correction circuitry is often included in systems that store data in memory or transfer data via a communication medium. The error detection circuitry can alert the system as to the presence of errors in data, which may, in turn, trigger action to correct the errors or modify system operation to mitigate the errors.

In some system, such as those systems that are subject to a functional safety standard (e.g., ISO26262), the operation of the error detection circuitry must be checked periodically for absence of faults. For example, error detection circuitry that checks for errors in data read from memory may be verified by causing data that contains errors to be read from memory and verifying that the error detection circuitry identifies the errors. Such systems include test circuitry for writing errors into memory, and a processor executing software that controls the introduction of the errors into memory and the verification of the error detection circuitry. The use of software-based testing reduces the number of execution cycles that are available for application processing.

The error detection circuitry of the present disclosure continuously verifies the operation of its operation without software control or intervention, thereby increasing the execution cycles available for application processing. The error detection circuitry disclosed herein includes redundant error checking circuits that operate continuously to verify operation of the error checking circuits with each data verification (e.g., each read of data from memory). Outputs of the redundant error checking circuits are compared, and any difference in the error detection results with respect to a data value is deemed an error or fault in the error detection circuitry. The circuitry comparing the outputs of the redundant error checking circuits is verified by forcing an error indication in the output of one of the redundant error checking circuits.

FIG. 1 shows a block diagram for an example system 100 that includes an error checking circuitry in accordance with the present disclosure. The system 100 includes a memory 102, an error detection circuit 104, and a processor 112. The memory 102 receives and stores the data 120. The error detection circuit 104 checks the data 118 read from the memory 102 for errors, and generates an interrupt signal 114 if an error is detected in the data 118. The processor 112 may execute an interrupt service responsive to activation of the interrupt signal 114. The processor 112 may be a microcontroller, a general-purpose microprocessor, or other circuit that executes instructions to provide functionality. The memory 102 may be a volatile storage device, such as a register or a static or dynamic random-access memory, or may be a non-volatile storage device, such as a FLASH memory or a ferroelectric memory.

The error detection circuit 104 includes an error checking circuit 106, an error checking circuit 108, and a comparison circuit 110. The error checking circuit 106 and the error checking circuit 108 are coupled in parallel to the memory 102. The error checking circuit 106 includes an input 106A that is coupled to a data output 102A of the memory 102, and the error checking circuit 108 includes an input 108A that is coupled to the data output 102A of the memory 102. Each of the error checking circuit 106 and the error checking circuit 108 independently verifies all bits of the data 118 read from the memory 102. The error checking circuit 106 generates an output signal 122 signifying whether the error checking circuit 106 has detected an error in the data 118. Similarly, the error checking circuit 108 generates an output signal 124 signifying whether the error checking circuit 108 has detected an error in the data 118. In some implementations of the system 100, the output signal 122 may be provided to the processor 112 or other circuitry to indicate the presence of an error in the data 118.

The comparison circuit 110 is coupled to the error checking circuit 106 and the error checking circuit 108, and compares the output signals 122 and 124 generated by the error checking circuit 106 and the error checking circuit 108 to verify the operation of the error checking circuit 106 and the error checking circuit 108. Because the error checking circuit 106 and the error checking circuit 106 verify the data 118 independently, if a fault develops in either the error checking circuit 106 or the error checking circuit 108, then the output signals 122 and 124 generated by the error checking circuit 106 and the error checking circuit 108 will be different. The comparison circuit 110 detects (determines whether there is) any difference in the output signal 122 and the output signal 124, and if a difference in the output signal 122 and the output signal 124 is detected (determined to exist), then the comparison circuit 110 activates the interrupt signal 114 to alert the processor 112 to a fault. The comparison circuit 110 includes an input 110A and an input 110B. The input 110A of the comparison circuit 110 is coupled to the output 106B of the error checking circuit 106 for reception of the output signal 122, and the input 110B of the comparison circuit 110 is coupled to the output 108B of the error checking circuit 108 for reception of the output signal 124. An interrupt output 110C of the comparison circuit 110 is coupled to an interrupt input 112B of the processor 112 for receipt of the interrupt signal 114 by the processor 112.

Because the error checking circuit 106 and the error checking circuit 108 are continually verifying the data 118 read from the memory 102, and the comparison circuit 110 is continually comparing the output signal 122 and the output signal 124 generated by the error checking circuit 106 and the error checking circuit 108, the error detection circuit 104 may verify the operation of the error checking circuit 106 and the error checking circuit 108 with every read access of the memory 102. Moreover, the error detection circuit 104 verifies operation of the error checking circuit 106 and the error checking circuit 108 without introducing errors into the memory 102. Consequently, the system 100 does not need special circuitry to create errors in the memory 102 for testing of the error detection circuit 104.

To test the operation of the comparison circuit 110, for example, to test comparison of the output signal 122 and the output signal 124, and to test generation of the interrupt signal 114, the error checking circuit 108 includes circuitry to force an error indication in the output signal 124. The error checking circuit 108 includes a force error input 108C that is coupled to a force error output 112A of the processor 112. The processor 112 activates a force error signal 116 to cause the error checking circuit 108 to generate an error indication in the output signal 124. Because the error checking circuit 106 did not detect an error in the data 118, output signal 122 is different from the output signal 124. The comparison circuit 110 detects the different output signals 122 and 124 and activates the interrupt signal 114.

In addition to use for verification of data read from memory, implementations of the error detection circuit 104 may be used in a variety of applications that require verification of data and are subject to a functional safety standard. For example, an implementation of the error detection circuit 104 may be applied to check data received via a communication channel, or to check data in other applications.

FIG. 2 shows a block diagram for an example error checking circuit 200 in accordance with the present disclosure. The error checking circuit 200 is an implementation of the error checking circuit 108 or the error checking circuit 106. The error checking circuit 200 includes a parity check circuit 204 and a controllable inverter (illustrated as an exclusive-OR gate) 206. The data 118 received by the error checking circuit 200 includes any number of data bits and parity (or error correction code bits, which are referred to herein as parity bits). The parity check circuit 204 includes circuitry that verifies the state of the data bits and the parity bits corresponding to the parity bits. For example, if a data value stored in the memory 102 includes 32 data bits, then one or more parity bits may be stored as corresponding to each byte of the 32-bit data value. The circuitry of the parity check circuit 204 processes each byte and corresponding parity bits to ensure that the data and parity bits have not been changed by storage in the memory. For example, the circuitry of the parity check circuit 204 processes a data byte and corresponding parity bits to ensure that the data byte and corresponding parity bits include an odd or even number of logical ones, or conform to other coding rule applied to create the parity bits written into the memory 102 with the data byte. On detection of an error in the data 118, the parity check circuit 204 asserts the error signal 210. The error signal 210 corresponds to the output signal 122 or the output signal 124 shown in FIG. 1.

For testing of the comparison circuit 110, the error checking circuit 200 can create an error in the data 118 received by the parity check circuit 204. To create an error, the controllable inverter 206 inverts a bit 208 of the data 118 under control of the force error signal 116, and provides the inverted bit 208 to the parity check circuit 204 as part of the data 118. The bit 208 may be a data bit or a parity bit of the data 118 in various implementations of the error checking circuit 200. The input 206A of the controllable inverter 206 may be coupled to ground to implement the error checking circuit 106.

FIG. 3 shows a block diagram for an example comparison circuit 300 in accordance with the present disclosure. The comparison circuit 300 is an implementation of the comparison circuit 110. The comparison circuit 300 includes a comparator (illustrated as exclusive-OR gate) 302, and an interrupt generation circuit 304. The comparator 302 compares the output signal 122 and the output signal 124. If the output signal 122 is different from the output signal 124, then the comparator 302 activates the output signal 306. The interrupt generation circuit 304 receives the output signal 306 and generates the interrupt signal 114 responsive to activation of the output signal 306.

FIG. 4 shows a block diagram for an example system 400 that includes error checking and correction circuitry in accordance with the present disclosure. The system 400 is similar to the system 100, but includes error correction in addition to error detection. The system 400 includes a memory 402, an error detection and correction circuit 404, and a processor 412. The memory 402 receives and stores the data 120. The data 120 includes data and error correction codes in some implementations. The error detection and correction circuit 404 checks the data 418 read from the memory 402 for errors, corrects detected errors, and generates an interrupt signal 414 if an error is detected in the data 118. The processor 412 may execute an interrupt service responsive to activation of the interrupt signal 414. The processor 412 may be a microcontroller, a general-purpose microprocessor, or other circuit that executes instructions to provide functionality. The memory 402 may be a volatile storage device, such as a register or a static or dynamic random-access memory, or may be a non-volatile storage device, such as a FLASH memory or a ferroelectric memory.

The error detection and correction circuit 404 includes an error checking and correction circuit 406, an error checking and correction circuit 408, and a comparison circuit 410. The error checking and correction circuit 406 and the error checking and correction circuit 408 are coupled in parallel to the memory 402. The error checking and correction circuit 406 includes an input 406A that is coupled to a data output 402A of the memory 402, and the error checking and correction circuit 408 includes an input 408A that is coupled to the data output 402A of the memory 402. Each of the error checking and correction circuit 406 and the error checking and correction circuit 408 independently verifies all bits of the data 418 read from the memory 102, corrects the data if an error is detected, and outputs the corrected data. The error checking and correction circuit 406 generates an output signal 422 signifying whether an error has been detected in the data 418, and generates corrected data 426. Similarly, the error checking and correction circuit 408 generates an output signal 424 signifying whether an error has been detected in the data 418, and generates corrected data 428. In some implementations of the system 400, the output signal 422 may be provided to the processor 412 or other circuitry to indicate the presence of an error in the data 418.

The comparison circuit 410 is coupled to the error checking and correction circuit 406 and the error checking and correction circuit 408. The comparison circuit 410 compares the output signals 422 and 424 generated by the error checking and correction circuit 406 and the error checking and correction circuit 408 to verify the error detection operation of the error checking and correction circuit 406 and the error checking and correction circuit 408. The comparison circuit 410 also compares the corrected data 426 generated by the error checking and correction circuit 406 and the corrected data 428 generated by the error checking and correction circuit 408 to verify the error correction operation of the error checking and correction circuit 406 and the error checking and correction circuit 408. Because the error checking and correction circuit 406 and the error checking and correction circuit 408 verify and correct the data 418 independently, if a fault develops in either the error checking and correction circuit 406 or the error checking and correction circuit 408, then the output signals 422 and 424 or the corrected data 426 and 428 generated by the error checking and correction circuit 406 and the error checking and correction circuit 408 will be different. The comparison circuit 410 detects any difference in the output signal 422 and the output signal 424, and any difference in the corrected data 426 and the corrected data 428, and if a difference is detected, the comparison circuit 410 activates the interrupt signal 414 to alert the processor 412 to a fault.

The comparison circuit 410 includes an input 410A an input 410B, an input 410C, and an input 410D. The input 410A of the comparison circuit 410 is coupled to the output 406B of the error checking and correction circuit 406 for reception of the output signal 422, and the input 410B of the comparison circuit 410 is coupled to the output 408B of the error checking and correction circuit 408 for reception of the output signal 424. The input 410C of the comparison circuit 410 is coupled to the output 406C of the error checking and correction circuit 406 for reception of the corrected data 426, and the input 410D of the comparison circuit 410 is coupled to the output 408C of the error checking and correction circuit 408 for reception of the corrected data 428. An interrupt output 410E of the comparison circuit 410 is coupled to an interrupt input 412B of the processor 412 for receipt of the interrupt signal 414 by the processor 412.

Because the error checking and correction circuit 406 and the error checking and correction circuit 408 are continually verifying and correcting the data 418 read from the memory 402, and the comparison circuit 410 is continually comparing the output signal 422 and the output signal 124, and the corrected data 426 and corrected data 428, the error detection and correction circuit 404 verifies the operation of the error checking and correction circuit 406 and the error checking and correction circuit 408 with every read access of the memory 402. Moreover, the error detection and correction circuit 404 verifies operation of the error checking and correction circuit 406 and the error checking and correction circuit 408 without introducing errors into the memory 402. Consequently, the system 400 does not need special circuitry to create errors in the memory 402 for testing of the error detection and correction circuit 404.

To test the operation of the comparison circuit 410, for example, to test comparison of the output signal 422 and the output signal 424, to test comparison of the corrected data 426 and the corrected data 428, and to test generation of the interrupt signal 414, the error checking and correction circuit 408 includes circuitry to force an error indication in the output signal 424, and to force an error in the corrected data 428. The error checking and correction circuit 408 includes a force error input 408D that is coupled to a force error output 412A of the processor 412. The processor 412 activates a force error signal 416 to cause the error checking and correction circuit 408 to generate an error indication in the output signal 424 and/or to generate an error in the corrected data 428. Forcing detection of an error in the error checking and correction circuit 408 makes the output signal 422 different from the output signal 424. Similarly, forcing an error in the corrected data 428 makes the corrected data 428 different from the corrected data 426. The comparison circuit 410 detects the different output signals 422 and 424, and/or the different corrected data 426 and 428, and activates the interrupt signal 414.

In addition to use for verification of data read from memory, implementations of the error detection circuit 104 may be used in a variety of applications that require verification of data and are subject to a functional safety standard. For example, an implementation of the error detection and correction circuit 404 may be applied to check and correct data received via a communication channel, or to check and correct data in other applications.

FIG. 5 shows a block diagram for an example error checking and correction circuit 500 suitable for use in an implementation of the error detection and correction circuit 404. The error checking and correction circuit 500 is an implementation of the error checking and correction circuit 408 or the error checking and correction circuit 406. The error checking and correction circuit 500 includes an error check and correct circuit 504, a controllable inverter (illustrated as an exclusive-OR gate) 506, and a controllable inverter 514. The data 418 received by the error checking and correction circuit 500 includes any number of data bits and error correction code bits. The error check and correct circuit 504 includes circuitry that verifies the state of the data bits based on the error correction code. For example, if a data value stored in the memory 102 includes 32 data bits and a 6-bit error correction code, the circuitry of the error check and correct circuit 504 processes the 32-bit data value and corresponding error correction code to ensure that the data and error correction code have not been changed by storage in the memory 102. On detection of an error in the data 418, the error check and correct circuit 504 asserts the error signal 510 and corrects the data to produce corrected data 516. The error signal 510 corresponds to the output signal 422 or the output signal 424 shown in FIG. 4.

For testing of the comparison circuit 410, the error checking and correction circuit 500 can create an error in the data 418 received by the error check and correct circuit 504, and/or create an error in the corrected data 516 output by the error check and correct circuit 504. To create an error to be detected by the error check and correct circuit 504, the controllable inverter 506 inverts a bit 508 of the data 418 under control of the force error signal 416, and provides the inverted bit 508 to the error check and correct circuit 504 as part of the data 418. The bit 508 may be a data bit or bit of the error correction code in various implementations of the error checking and correction circuit 500. The input 506A of the controllable inverter 506 may be coupled to ground to implement the error checking and correction circuit 406.

In some implementations, to create an error in the corrected data 516, the controllable inverter 514 inverts a bit of the corrected data 516 under control of the force error signal 416. Some implementations may create an error in the corrected data 516 by inverting multiple bits of the data 418 (e.g., inverting more bits of the data 418 than the error check and correct circuit 504 can correct). The force error signal 416 may include a first control signal for controlling the controllable inverter 506, and a second control signal for controlling the controllable inverter 514 in some implementations.

FIG. 6 shows a block diagram for an example comparison circuit 600 suitable for use in an implementation of the error detection and correction circuit 404. The comparison circuit 600 is an implementation of the comparison circuit 410. The comparison circuit 600 includes a comparator (illustrated as exclusive-OR gate) 602, and an interrupt generation circuit 604, and a comparator 608. The comparator 602 compares the output signal 422 and the output signal 424. The comparator 608 bit-wise compares the corrected data 426 and the corrected data 428. If the output signal 422 is different from the output signal 424, then the comparator 602 activates the output signal 606. If the corrected data 426 is different from the corrected data 428, then the comparator 608 activates the output signal 610. The interrupt generation circuit 304 receives the output signal 606 and the output signal 610 and generates the interrupt signal 414 responsive to activation of the output signal 606 or the output signal 610.

FIG. 7 shows a flow diagram for an example method 700 for error checking in accordance with the present disclosure. Though depicted sequentially as a matter of convenience, at least some of the actions shown can be performed in a different order and/or performed in parallel. Additionally, some implementations may perform only some of the actions shown. Operations of the method 700 may be performed by the system 100, the system 400, or other circuit that includes an implementation of the error detection circuit 104 or the error detection and correction circuit 404. In the following description, references to components of the system 100 are also applicable to the system 400.

In block 702, a data value is read from the memory 102 and provided to the error detection circuit 104 and the error checking circuit 106 as the data 118.

In block 704, a determination is made as to whether the comparison circuit 110 and reception of interrupts by the processor 112 is to be tested. If the comparison circuit 110 is to be tested, then in block 706, the processor 112 activates the force error signal 116.

In block 708, responsive to activation of the force error signal 116, the error checking circuit 108 inverts a bit of the data 118 to create an error to be detected, or in the system 400 inverts a bit of the corrected data 428 to create an error in correction.

In block 710, the error checking circuit 106 processes the data and parity bits of the data 118 to determine whether there is an error in the data 118. The error checking circuit 106 sets the output signal 122 to indicate whether an error was detected in the data 118.

In block 712, the error checking circuit 108 processes the data and parity bits of the data 118 to determine whether there is an error in the data 118. The error checking circuit 108 sets the output signal 124 to indicate whether an error was detected in the data 118. If a bit of the data 118 was inverted in block 708, then the error checking circuit 108 sets the output signal 124 to indicate that an error was detected in the data 118.

In block 714, the comparison circuit 110 compares the output signal 122 and the output signal 124 (and in the system 400 compares the corrected data 426 and 428). If, in block 716, the output signal 122 and the output signal 124 are the same then the comparison circuit 110 does not activate the interrupt signal 114, and no error in operation of the error checking circuit 106 or the error checking circuit 108 is indicated in block 722.

If, in block 716, the output signal 122 and the output signal 124 are different, then the comparison circuit 110 activates the interrupt signal 114, in block 718, to indicate that an error in the operation of the error checking circuit 106 or the error checking circuit 108 has been identified.

In block 720, the processor 112 receives the interrupt signal 114 and executes an interrupt service routine for handling a detected fault in the error detection circuit 104. For example, the interrupt service routine may notify a user of the system 100 of the detected fault in the error detection circuit 104.

In implementations of the method 700, the operations of blocks 704, 706, and 708 may be performed when the comparison circuit 110 and interrupt routing are to be tested, while the operations of blocks 710-722 are performed with each data value provided to the error detection circuit 104.

Figure 8:
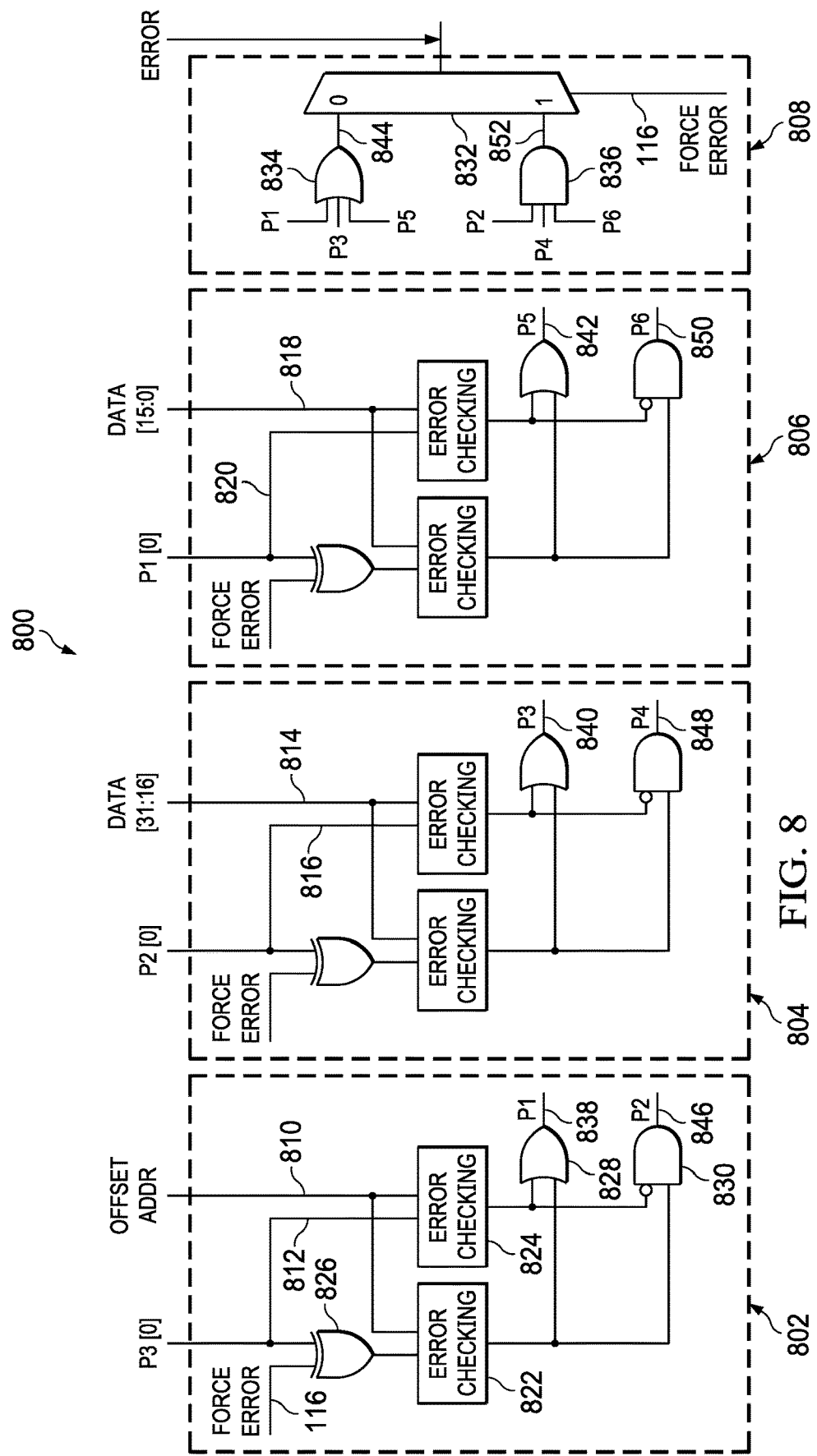
FIG. 8 shows a block diagram for an example system that includes error checking circuitry in accordance with the present disclosure.

FIG. 8 shows a block diagram for an example system 800 that includes error checking circuitry in accordance with the present disclosure. The system 800 includes error circuitry 802, error circuitry 804, error circuitry 806, and output circuitry 808. The error circuitry 802, the error circuitry 804, and the error circuitry 806 are identical, and each checks a different data set for errors. For example, the error circuitry 802 checks an address offset value 810 with respect to a parity value 812, the error circuitry 804 checks a data value 814 (bits 16-31) with respect to a parity value 816, and the error circuitry 806 checks a data value 818 (bits 0-15) with respect to a parity value 820. The error circuitry 802, the error circuitry 804, and the error circuitry 806 operate identically, and operation of the error circuitry 802 as described herein is applicable to the error circuitry 804 and the error circuitry 806. The system 800 may be coupled to a memory, such as the memory 102, and the data values and parity values processed by the system 800 may be read from the memory.

The error circuitry 802 includes error checking circuit 822, error checking circuit 824, exclusive-OR gate 826, OR gate 828, and AND gate 830. The error checking circuit 822 and the error checking circuit 824 may be identical, and each checks the address offset value 810 with respect to the parity value 812. The error checking circuit 822 and the error checking circuit 824 may be similar to the parity check circuit 204 in some implementations of the system 800. The exclusive-OR gate 826 selectably inverts the parity value 812, under control of the force error signal 116, to force detection of an error in the error checking circuit 822. The OR gate 828 combines the outputs of the error checking circuit 822 and the error checking circuit 824 to provide an error signal 838 that indicates detection of an error by either the error checking circuit 822 or the error checking circuit 824. The AND gate 830 provides an output signal 846 that indicates the error checking circuit 822 has detected an error and the error checking circuit 824 has not detected an error. Thus, the AND gate 830 serves as a comparator for detecting a specific difference in the output of the error checking circuit 822 and the error checking circuit 824.

The output circuitry 808 includes a selector 832, an OR gate 834, and an AND gate 836. The OR gate 834 combines the error signal 838, the error signal 840, and the error signal 842 produced by the OR gates of the error circuitry 802, the error circuitry 804, and the error circuitry 806 to generate a signal 844 indicating that an error was detected by any error checking circuit of the error circuitry 802, the error circuitry 804, or the error circuitry 806. The AND gate 836 combines the output 846, the output 848, and the output 850 to generate a signal 852 indicating that all of the error circuitry 802, the error circuitry 804, and the error circuitry 806 detected an error in one error checking circuit, and did not detect an error in the other error checking circuit. The selector 832 selectively routes the signal 844 or the signal 852 to an error processing device, such as the processor 112. When the force error signal 116 is inactive, the selector 832 selects the signal 844, and when the force error signal 116 is active the selector 832 selects the signal 854.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device comprising:
   a first error check and correct circuit that includes:
      an error output configured to provide a first error signal;
      a data output configured to provide a first set of corrected data;
   a second error check and correct circuit that includes:
      an error output configured to provide a second error signal;
      a data output configured to provide a second set of corrected data; and
   a comparison circuit that includes:
      a first error input coupled to the error output of the first error check and correct circuit;
      a second error input coupled to the error output of the second error check and correct circuit;
      a first data input coupled to the data output of the first error check and correct circuit; and
      a second data input coupled to the data output of the second error check and correct circuit.

2. The device of claim 1, wherein the second error check and correct circuit includes a force error input.

3. The device of claim 2, wherein the second error check and correct circuit includes:
   an exclusive OR gate that includes:
      a first input coupled to the force error input; and
      an output; and
   an error check and correct subcircuit that includes:
      a first input coupled to the output of the exclusive OR gate;
      a data output configured to provide an intermediate set of data that includes at least a subset of the second set of corrected data; and
      an error output configured to provide the second error signal.

4. The device of claim 3, wherein:
   the exclusive OR gate is a first exclusive OR gate; and
   the second error check and correct circuit includes a second exclusive OR gate that includes:
      a first input coupled to the error check and correct subcircuit to receive a bit of the intermediate set of data;
      a second input coupled to the force error input; and
      an output configured to provide an exclusive OR output signal such that the exclusive OR output signal and a remainder of the intermediate set of data are the second set of corrected data.

5. The device of claim 2 further comprising a processor coupled to the force error input to provide a force error signal.

6. The device of claim 1, wherein the comparison circuit is configured to:
   compare the first set of corrected data to the second set of corrected data;
   compare the first error signal to the second error signal; and
   generate an interrupt based on a mismatch in either of the comparison of the first set of corrected data to the second set of corrected data or the comparison of the first error signal to the second error signal.

7. The device of claim 6 further comprising a processor coupled to the comparison circuit to receive the interrupt.

8. The device of claim 1 further comprising a memory coupled to the first error check and correct circuit and to the second error check and correct circuit, wherein the memory is configured to provide a set of data to the first error check and correct circuit and the second error check and correct circuit in parallel.

9. The device of claim 1, wherein the first error check and correct circuit is configured to provide the first error signal based on an offset address or a portion of a memory data output value.

10. A device comprising:
   a first error check and correct circuit configured to:
      determine whether an error is present in a set of data;
      provide a first error signal based on whether the error is present in the set of data; and
      provide a first set of corrected data that corresponds to the set of data;
   a second error check and correct circuit configured to, concurrent with the first error check and correct circuit:
      determine whether the error is present in the set of data;
      provide a second error signal based on whether the error is present in the set of data; and
      provide a second set of corrected data that corresponds to the set of data; and
   a comparison circuit coupled to the first error check and correct circuit and to the second error check and correct circuit, wherein the comparison circuit is configured to:
      compare the first error signal to the second error signal; and
      compare the first set of corrected data to the second set of corrected data.

11. The device of claim 10, wherein the second error check and correct circuit is configured to:
   receive a force error signal; and
   based on the force error signal, determine whether to alter a bit of the set of data prior to the determination of whether the error is present in the set of data.

12. The device of claim 11, wherein the second error check and correct circuit is configured to, based on the force error signal, determine whether to alter a bit of the second set of corrected data.

13. The device of claim 10, wherein the second error check and correct circuit is configured to:
   receive a force error signal; and
   based on the force error signal, determine whether to alter a bit of the second set of corrected data.

14. The device of claim 10, wherein the comparison circuit is configured to generate an interrupt based on either the comparison of the first error signal to the second error signal or the comparison of the first set of corrected data to the second set of corrected data.

15. The device of claim 14 further comprising a processor coupled to the comparison circuit to receive the interrupt.

16. The device of claim 10 further comprising a memory coupled to the first error check and correct circuit and to the second error check and correct circuit to provide the set of data to the first error check and correct circuit and the second error check and correct circuit in parallel.

17. The device of claim 10, wherein the set of data includes at least one of: an offset address or a portion of a memory data output value.

18. A method comprising:
   determining, by a first error check and correct circuit, whether an error is present in a set of data;
   determining, by a second error check and correct circuit, whether the error is present in the set of data;
   providing a first error signal by the first error check and correct circuit;
   providing a second error signal by the second error check and correct circuit;
   comparing the first error signal to the second error signal;
   providing a first set of corrected data based on the set of data by the first error check and correct circuit;
   providing a second set of corrected data based on the set of data by the second error check and correct circuit; and
   comparing the first set of corrected data to the second set of corrected data.

19. The method of claim 18 further comprising providing an interrupt based on a mismatch associated with either of the comparing the first error signal to the second error signal or the comparing the first set of corrected data to the second set of corrected data.

20. The method of claim 18 further comprising:
   receiving a force error signal; and
   determining whether to alter a bit of the set of data as received by the second error check and correct circuit based on the force error signal.

* * * * *